(12) United States Patent
Kim et al.

(10) Patent No.: US 10,360,839 B2
(45) Date of Patent: Jul. 23, 2019

(54) APPARATUS AND METHOD OF DRIVING A VARIABLE RATE DISPLAY

(71) Applicant: SAMSUNG DISPLAY CO., LTD., Yongin-si, Gyeonggi-do (KR)

(72) Inventors: Heendol Kim, Yongin-si (KR); Jai-Hyun Koh, Yongin-si (KR); Jaehoon Lee, Seoul (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 50 days.

(21) Appl. No.: 15/812,188

(22) Filed: Nov. 14, 2017

(65) Prior Publication Data

US 2018/0330656 A1    Nov. 15, 2018

(30) Foreign Application Priority Data

Nov. 18, 2016    (KR) .......................... 10-2016-0154367

(51) Int. Cl.
  *G09G 3/20*      (2006.01)
  *G06T 1/20*      (2006.01)
  *G06T 1/60*      (2006.01)

(52) U.S. Cl.
  CPC ............. *G09G 3/2092* (2013.01); *G06T 1/20* (2013.01); *G06T 1/60* (2013.01); *G09G 2320/0247* (2013.01); *G09G 2360/12* (2013.01)

(58) Field of Classification Search
  None
  See application file for complete search history.

(56) References Cited

U.S. PATENT DOCUMENTS

| 2012/0068993 | A1* | 3/2012 | Kambhatla | G09G 5/00 345/213 |
| 2014/0198093 | A1* | 7/2014 | Nambi | G09G 3/36 345/212 |
| 2016/0275916 | A1* | 9/2016 | Glen | G09G 5/395 |
| 2017/0249920 | A1* | 8/2017 | Cook | G09G 5/006 |

FOREIGN PATENT DOCUMENTS

| KR | 10-2010-0068625 | 6/2010 |
| KR | 10-2016-0099277 | 8/2016 |
| KR | 10-2017-0028479 | 3/2017 |

* cited by examiner

*Primary Examiner* — Kee M Tung
*Assistant Examiner* — Patrick F Valdez
(74) *Attorney, Agent, or Firm* — F. Chau & Associates, LLC (57) ABSTRACT

A display apparatus includes a frame memory storing an input image signal having first and second reference blank durations respectively corresponding to a first frame and a second frame. A blank controller circuit determines a second delay blank duration based on the first and second reference blank durations and a first delay blank duration, a signal delay part generates an output image signal having the first and second delay blank durations corresponding to the first frame and second frame, respectively, is based on the stored input image signal, and a display panel displays an image based on the output image signal. The display apparatus may reduce or prevent flicker caused by variations in driving frequency that may be variable on a per-frame basis. A blank duration of a frame is controller, or a frame may be inserted in a blank duration based on blank durations of adjacent frames.

21 Claims, 12 Drawing Sheets

APPARATUS AND METHOD OF DRIVING A VARIABLE RATE DISPLAY

CROSS-REFERENCE TO RELATED APPLICATION

This application claims priority under 35 U.S.C. § 119 from Korean Patent Application No. 10-2016-0154367, filed on Nov. 18, 2016 in the Korean Intellectual Property Office (KIPO), the contents of which are herein incorporated by reference.

TECHNICAL FIELD

Embodiments of the present inventive concept relate generally to display devices, and more particularly to display apparatuses and methods of driving the display apparatuses.

DISCUSSION OF THE RELATED ART

Generally, a liquid crystal display ("LCD") apparatus may be constructed of a first substrate and a pixel electrode, a second substrate including a common electrode and a liquid crystal layer disposed between the first and second substrate. An electric field is generated by voltages applied to the pixel electrode and the common electrode. An adjustment of an intensity of the electric field may adjust a transmittance of a light passing through the liquid crystal layer so that a desired image may be displayed.

The LCD apparatus includes a display panel and a panel driver. The display panel includes a plurality of gate lines, a plurality of data lines, and a plurality of pixels connected to both of the gate lines and the data lines. The panel driver includes a gate driver that provides gate signals to the gate lines and a data driver providing data voltages to the data lines.

Meanwhile, a driving frequency may be variable by each frame according to a rendering speed of a graphic processing unit ("GPU"). Accordingly, the variation in the driving frequency may introduce a flicker of the displayed images because of the luminance difference.

SUMMARY

An embodiment of the present inventive concept may provide a display apparatus capable of enhancing display quality.

An embodiment of the present inventive concept may provide a method of driving the display apparatus.

An embodiment of the present inventive concept may provide another method of driving the display apparatus.

A display apparatus according to an embodiment of the present inventive concept may includes a frame memory configured to store an input image signal having a first reference blank duration corresponding to a first frame and a second reference blank duration corresponding to a second frame subsequent to the first frame, a blank controller circuit configured to determine a second delay blank duration based on the first and second reference blank durations and a first delay blank duration, a signal delay part configured to generate an output image signal having the first delay blank duration corresponding to the first frame and the second delay blank duration corresponding to the second frame based on the input image signal stored in the frame memory, and a display panel configured to display an image based on the output image signal generated by the signal delay part.

In an embodiment of the present inventive concept, the blank controller circuit may include a blank duration calculator configured to calculate the second delay blank duration based on a first duration, the first reference blank duration and the first delay blank duration, the first duration being a duration between an end of an active duration of the second frame and an end of the second reference blank duration.

In an embodiment of the present inventive concept, the second delay blank duration may be equal to MAX (the first duration, MAX (the first reference blank duration, the first delay blank duration)/N), wherein the N is greater than 1.

In an embodiment of the present inventive concept, the N may be greater than or equal to 2.5 and smaller than or equal to 4.

In an embodiment of the present inventive concept, the blank controller circuit may further include a reference blank duration counter configured to count the first and second reference blank durations based on an input data enable signal corresponding to the input image signal, and a delay blank duration counter configured to count a blank duration of the second frame based on an output data enable signal corresponding to the output image signal.

In an embodiment of the present inventive concept, the signal delay part may be configured to generate the output image signal so that the blank duration of the second frame is substantially the same as the second delay blank duration.

In an embodiment of the present inventive concept, the blank controller circuit may further include a reference blank duration register configured to store a count value of the reference blank duration counter, and a delay blank duration register configured to store a count value of the delay blank duration counter.

In an embodiment of the present inventive concept, the blank controller circuit may be configured to receive information about a third reference blank duration corresponding to a third frame subsequent to the second frame, and the blank controller circuit may include a blank duration calculator configured to calculate the second delay blank duration based on a first duration, the first reference blank duration, the first delay blank duration and the third reference blank duration, the first duration being a duration between an end of an active duration of the second frame and an end of the second reference blank duration.

In an embodiment of the present inventive concept, the second delay blank duration may be equal to MAX (the first duration, MAX (the first reference blank duration, the first delay blank duration)/N, the third reference blank duration/M), wherein each of the N and the M is greater than 1.

In an embodiment of the present inventive concept, each of the N and the M may be greater than or equal to 2.5 and smaller than or equal to 6.

In an embodiment of the present inventive concept, the input image signal may be a rendered signal, and may have a variable frequency by each frame according to rendering speed.

In an embodiment of the inventive concept, the input image signal may be a signal rendered in a Graphics Processing Unit (GPU) having a variable frequency per-frame according to rendering speed, and the signal delay part may be constructed of a signal generator that receives the output image signal from an interface of the frame memory and generates one or more output image signal control signals and data signal, and a data enable signal controller that compares a reference blank duration with an reference active duration, and generates an output data enable signal (DE') to control the signal generator to insert image data of an active duration of a particular frame in a blank duration of the particular frame, when the reference blank duration is longer than the active duration of the particular frame.

A method of driving a display apparatus according to an embodiment of the present inventive concept may include storing an input image signal having a first reference blank duration corresponding to a first frame and a second reference blank duration corresponding to a second frame subsequent to the first frame, generating a first output image signal having a first delay blank duration corresponding to the first frame, determining a second delay blank duration based on the first and second reference blank durations and the first delay blank duration, generating a second output image signal having the second delay blank duration corresponding to the second frame, and displaying an image based on the first and second output image signals.

In an embodiment of the present inventive concept, the determining the second delay blank duration may include calculating the second delay blank duration based on a first duration, the first reference blank duration and the first delay blank duration, the first duration being a duration between an end of an active duration of the second frame and an end of the second reference blank duration.

In an embodiment of the present inventive concept, the second delay blank duration is equal to MAX (the first duration, MAX (the first reference blank duration, the first delay blank duration)/N), wherein the N is greater than 1. MAX may be a maximum duration.

In an embodiment of the present inventive concept, the method may further include counting the first and second reference blank durations based on an input data enable signal corresponding to the input image signal, and counting a blank duration of the second frame based on an output data enable signal corresponding to the second output image signal.

In an embodiment, the method may further include comparing the blank duration of the second frame with the second delay blank duration.

In an embodiment of the of the present inventive concept, the method may further include receiving information about a third reference blank duration corresponding to a third frame subsequent to the second frame, and calculating the second delay blank duration based on a first duration, the first reference blank duration, the first delay blank duration and the third reference blank duration, the first duration being a duration between an end of an active duration of the second frame and an end of the second reference blank duration.

In an embodiment of the of the present inventive concept, the second delay blank duration may be equal to MAX (the first duration, MAX (the first reference blank duration, the first delay blank duration)/N, the third reference blank duration/M), wherein each of the N and the M is greater than 1.

In an embodiment of the of the present inventive concept, the input image signal may be a rendered signal, and may have a variable frequency by each frame according to rendering speed.

Another method of driving a display apparatus according to an embodiment of the present inventive concept may include storing an input image signal having a first reference active duration and a first reference blank duration corresponding to a first frame and a second reference active duration and a second reference blank duration corresponding to a second frame subsequent to the first frame, generating an output image signal having a first delay blank duration corresponding to the first frame, comparing the second reference blank duration with the second reference active duration, inserting an input image signal of the second reference active duration in a blank duration of the second frame to generate the output image signal if the second reference blank duration is longer than the second reference active duration, determining a second delay blank duration based on the first and second reference blank durations and the first delay blank duration and generating the output image signal having the second delay blank duration corresponding to the second frame if the second reference blank duration is shorter than the second reference active duration, and displaying an image based on the output image signal.

According to an embodiment of the present invention, when a driving frequency is variable by each frame, a blank duration of a frame is controlled, or a frame is inserted in the blank duration, based on blank durations of adjacent frames so that a rapid variation in a frequency between frames can be prevented. Accordingly, there can be an elimination or reduction in flicker. Thus, display quality of the display panel can be increased.

BRIEF DESCRIPTION OF THE DRAWINGS

The present inventive concept will become better appreciated by a person of ordinary skill in the art based on a description in at least one detailed embodiments discussed with reference to the accompanying drawings, in which.

DETAILED DESCRIPTION

Hereinafter, the present inventive concept will be explained in detail with reference to the accompanying drawings.

Figure 1:
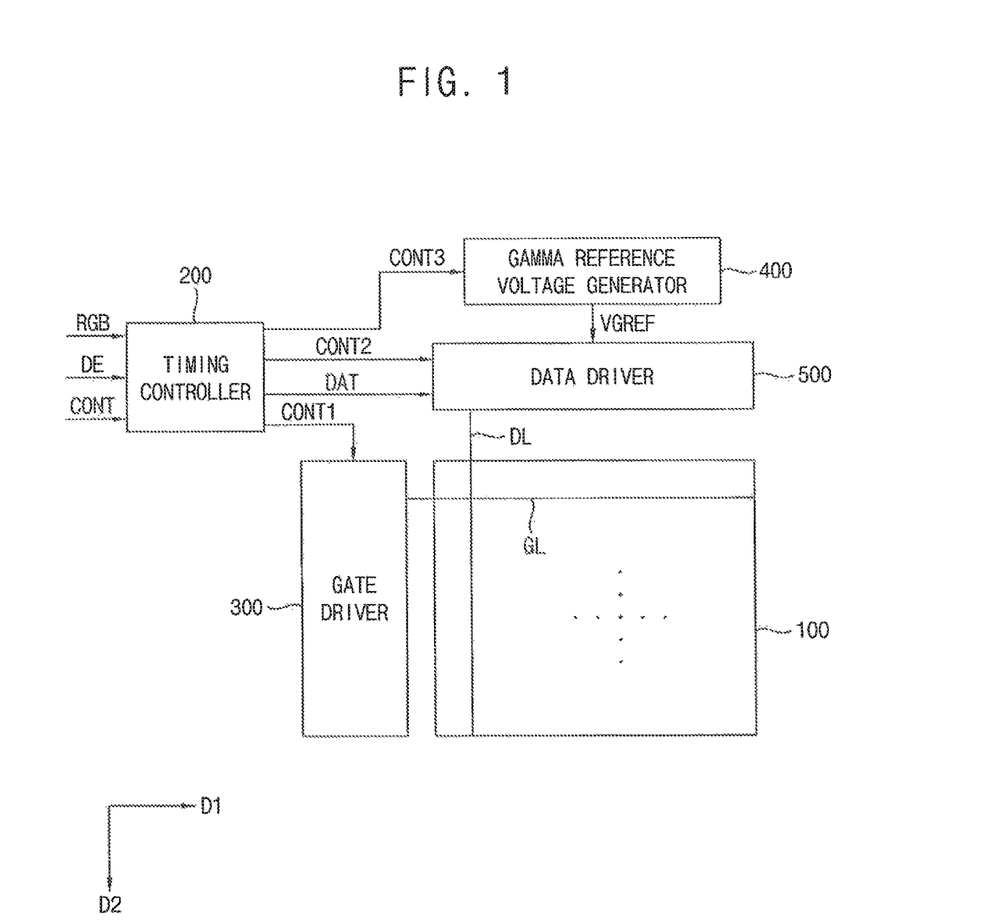
FIG. 1 is a block diagram illustrating a display apparatus according to an embodiment of the inventive concept.

FIG. 1 is a block diagram illustrating a display apparatus according to an embodiment of the inventive concept.

Referring to FIG. 1, the display apparatus includes a display panel 100 and a panel driver. The panel driver includes a timing controller 200, a gate driver 300, a gamma reference voltage generator 400 and a data driver 500.

The display panel 100 includes a display region for displaying an image and a peripheral region adjacent to the display region.

The display panel 100 includes a plurality of gate lines GL, a plurality of data lines DL and a plurality of pixels electrically connected to the gate lines GL and the data lines DL. The gate lines GL extend in a first direction D1 and the data lines DL extend in a second direction D2 crossing the first direction D1.

In some embodiments of the inventive concept, the pixels may include a switching element (not shown), a liquid crystal capacitor (not shown) and a storage capacitor (not shown). The liquid crystal capacitor and the storage capacitor may be electrically connected to the switching element. The pixels may be arranged in a matrix configuration.

With continued reference to FIG. 1, the timing controller 200 receives input image data RGB, an input data enable signal DE and an input control signal CONT from an external device (not shown). The input image data RGB may be used as would an input image signal. For example, the input image data RGB may include a red image data R, a green image data G and a blue image data B. The input data enable signal DE may include information about timings of the input image data RGB. For example, the input data enable signal DE may include information about a frequency of an input image and a blank duration. The input control signal CONT may include a master clock signal. The input control signal CONT may further include a vertical synchronizing signal and a horizontal synchronizing signal.

In addition, in response to receiving the signals CONT, DE and RGB, the timing controller 200 generates a first control signal CONT1, a second control signal CONT2, a third control signal CONT3 and a data signal DAT, which are applied to other components shown in FIG. 1. For example, based on the received input image data RGB, the input data enable signal DE and the input control signal CONT, the timing controller 200 can output various control signals to the gate driver 300, the gamma reference voltage generator 400, and the data driver 500.

The timing controller 200 generates the first control signal CONT1 for controlling operations of the gate driver 300 based on receiving the input control signal CONT and the input data enable signal DE, and outputs the first control signal CONT1 to the gate driver 300. The first control signal CONT1 may include a vertical start signal and a gate clock signal.

The timing controller 200 generates the second control signal CONT2 for controlling operations of the data driver 500 based on receiving the input control signal CONT and the input data enable signal DE, and outputs the second control signal CONT2 to the data driver 500. The second control signal CONT2 may include a horizontal start signal and a load signal.

The timing controller 200 generates the third control signal CONT3 for controlling operations of the gamma reference voltage generator 400 based on the input control signal. CONT and the input data enable signal DE, and outputs the third control signal CONT3 to the gamma reference voltage generator 400.

The timing controller 200 generates the data signal DAT based on the input image data RGB. The timing controller 200 outputs the data signal. DAT to the data driver 500. The data signal DAT may be substantially the same image data as the input image data RGB or the data signal DAT may be compensated image data generated by performing compensating of the input image data RGB. For example, the timing controller 200 may selectively perform an image quality compensation, a spot compensation, an adaptive color correction (ACC), and/or a dynamic capacitance compensation (DCC) on the input image data RGB to generate the data signal DAT. The timing controller 200 will be discussed in more detail with reference to FIGS. 2, 3, 9 and 10.

With continued reference to FIG. 1, the gate driver 300 generates gate signals for driving the gate lines GL in response to the first control signal CONT1 received from the timing controller 200. The gate driver 300 sequentially outputs the gate signals to the gate lines GL.

In some embodiments of the inventive concept, the gate driver 300 may be directly mounted on the display panel 100, or may be connected to the display panel 100 as a tape carrier package (TCP) type. Alternatively, the gate driver 300 may be integrated on the peripheral region of the display panel 100.

As also shown in FIG. 1, the gamma reference voltage generator 400 generates a gamma reference voltage VGREF in response to the third control signal CONT3 received from the timing controller 200. The gamma reference voltage generator 400 outputs the gamma reference voltage VGREF to the data driver 500. The level of the gamma reference voltage VGREF corresponds to grayscales of a plurality of pixel data included in the data signal DAT.

In some embodiments of the inventive concept, the gamma reference voltage generator 400 may be disposed in the timing controller 200, or may be disposed in the data driver 500.

The data driver 500 receives the second control signal CONT2 and the data signal DAT from the timing controller 200, and receives the gamma reference voltage VGREF from the gamma reference voltage generator 400. The data driver 500 converts the data signal DAT to data voltages having analogue levels based on the gamma reference voltage VGREF. The data driver 500 outputs the data voltages to the data lines DL.

In some embodiments of the inventive concept, the data driver 500 may be directly mounted on the display panel 100, or may be connected to the display panel 100 as a tape carrier package (TCP) type. Alternatively, the data driver 500 may be integrated on the peripheral region of the display panel 100.

Figure 2:
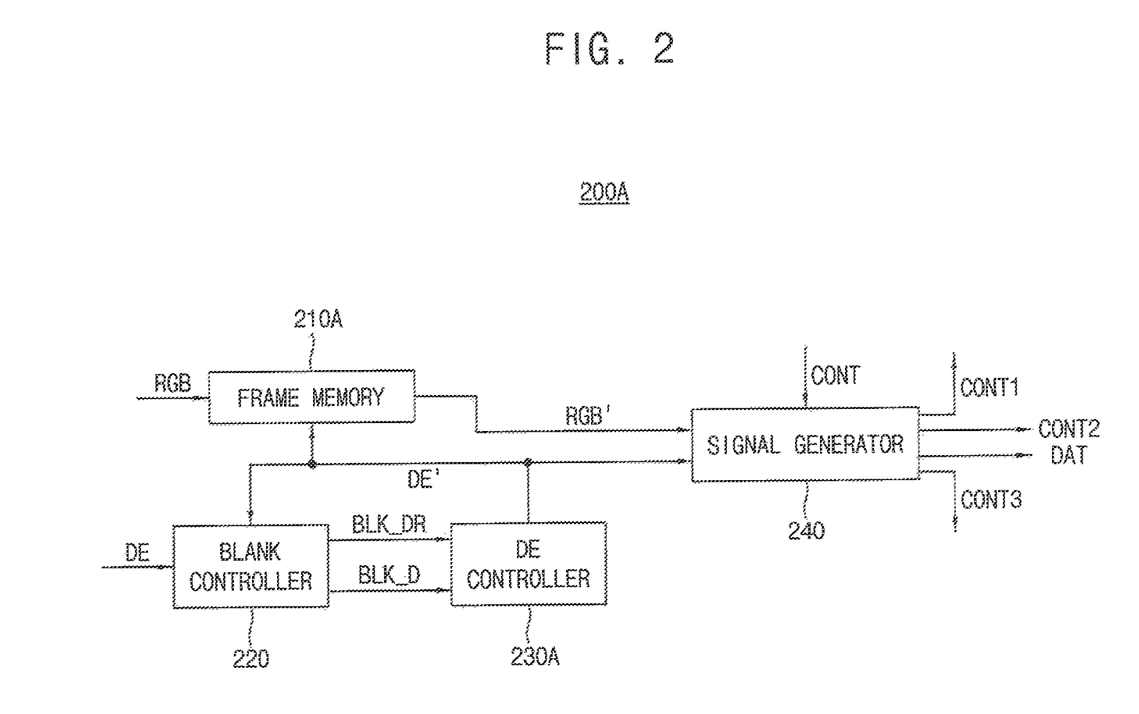
FIG. 2 is a block diagram illustrating a timing controller included in a display apparatus according to an embodiment of the inventive concept.
Figure 3:
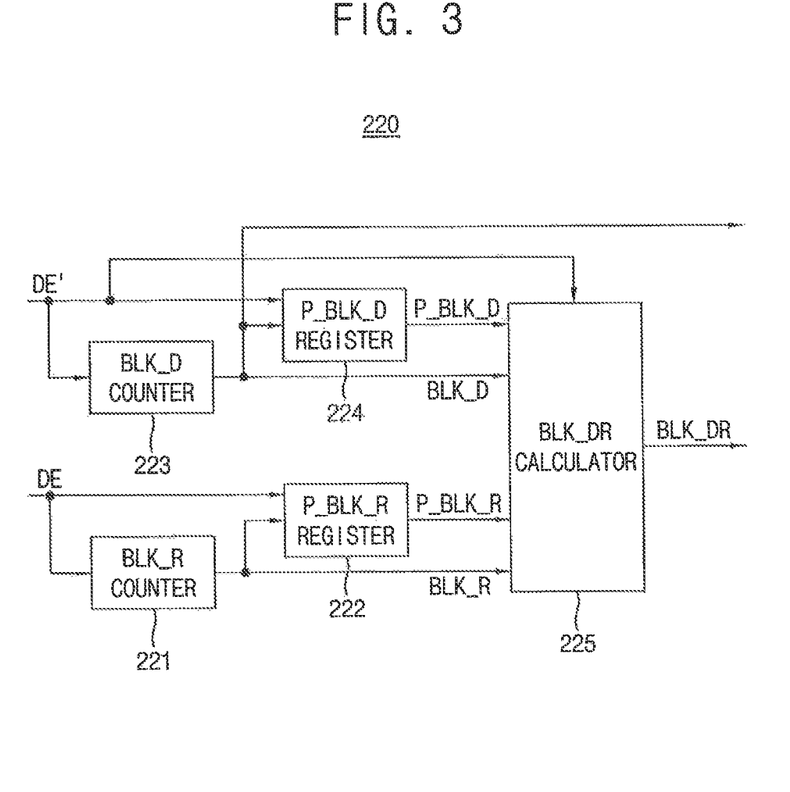
FIG. 3 is a block diagram illustrating a blank controller circuit included in a display apparatus according to an embodiment of FIG. 2.

The method of generating the data signal DAT based on the input image data RGB will now be explained in detail with reference to FIGS. 2 through 12. FIG. 2 is a block diagram illustrating a timing controller 200 included in a display apparatus according to an embodiment of the inventive concept. FIG. 3 is a block diagram illustrating a blank controller circuit 220 included in a display apparatus according to an embodiment of FIG. 2. A person of ordinary skill in the art should understand and appreciate that the inventive concept is not limited to the embodiments shown and described herein.

Referring to FIGS. 1 through 3, a timing controller 200A includes a frame memory 210A, a blank controller circuit 220, a data enable signal controller 230A and a signal generator 240. The data enable signal controller 230A and the signal generator 240 may be collectively referred to as a signal delay part.

The frame memory 210A receives the input image data RGB. The frame memory 210A stores the input image data RGB. For example, the frame memory 210A may store input image data that corresponds to a present frame.

Referring now to FIG. 3, the blank controller circuit 220 may include a blank duration calculator 225. The blank controller circuit 220 may further include circuitry configured as a reference blank duration counter 221 (outputs BLK_R) and a delay blank duration counter 223 (outputs BLK_D). The blank controller circuit 220 may further include a reference blank duration register 222 (outputs P_BLK_R) and a delay blank duration register 224 (outputs P_BLK_D).

The reference blank duration counter 221 receives the input data enable signal DE The reference blank duration counter 221 counts a blank duration of the input image based on the input data enable signal DE. For example, the reference blank duration counter 221 may count blank durations corresponding to a previous frame and durations corresponding to the present frame of the input image. The reference blank duration counter 221 outputs a reference blank duration BLK_R, which is a result of the counting, to the reference blank duration register 222 and the blank duration calculator 225.

With continued reference to FIG. 3, the reference blank duration register 222 receives the input data enable signal DE and the reference blank duration BLK_R. The reference blank duration register 222 may store the reference blank duration BLK_R. For example, the reference blank duration register 222 may store the reference blank duration BLK_R corresponding to the previous frame of the input image, in addition, the reference blank duration register 222 may be updated at an end of an active duration of each frame referring to the input data enable signal DE. The reference blank duration register 222 outputs a previous reference blank duration P_BLK_R, which is the stored value, to the blank duration calculator 225. Thus, the blank duration calculator 225 may receive both a blank duration count for a current frame and a previous frame.

The delay blank duration counter 223 receives an output data enable signal DE'. The delay blank duration counter 223 counts a blank duration of the output image based on the output data enable signal DE'. For example, the delay blank duration counter 223 may count blank durations corresponding to the previous frame and the present frame of the output image, whereas the reference blank duration counter 221 may count durations corresponding to the previous frame and current frame of the input image. The delay blank duration counter 223 outputs an actual blank duration BLK_D, which is a result of the counting, to the date enable signal controller 230A, the delay blank duration register 224 and the blank duration calculator 225.

The delay blank duration register 224 receives the output data enable signal DE' and the actual blank duration BLK_D. The delay blank duration register 224 may store the actual blank duration BLK_D. For example, the delay blank duration register 224 may store the actual blank duration BLK_D corresponding to the previous frame of the output image. The delay blank duration register 224 may be updated at an end of an active duration of each frame referring to the output data enable signal DE'. The delay blank duration register 224 outputs a previous actual blank duration P_BLK_D, which is the stored value, to the blank duration calculator 225.

The blank duration calculator 225 receives the reference blank duration BLK_R, the actual blank duration BLK_D the previous reference blank duration P_BLK_R, the previous actual blank duration P_BLK_D and the output data enable signal DE'. The blank duration calculator 225 calculates a delay blank duration BLK_DR based on the reference blank duration BLK_R, the previous reference blank duration P_BLK_R and the previous actual blank duration P_BLK_D. Alternatively, the blank duration calculator 225 may receive information about a blank duration of a next frame of the input image. In this case, the blank duration calculator 225 may calculate the delay blank duration BLK_DR based on the reference blank duration BLK_R, the previous reference blank duration P_BLK_R, the previous actual blank duration P_BLK_D and the blank duration of the next frame. The blank duration calculator 225 outputs the delay blank duration BLK_DR to the date enable signal controller 230A (FIG. 2).

The operation of the blank duration calculator 225 will be explained in detail with reference to FIGS. 4, 5, 7 and 8 herein below.

The date enable signal controller 230A receives the actual blank duration BLK_D and the delay blank duration BLK_DR. The date enable signal controller 230A may compare the actual blank duration BLK_D with the delay blank duration BLK_DR. The date enable signal controller 230A may generate the output data enable signal DE' so that the actual blank duration BLK_D is substantially the same as the delay blank duration BLK_DR. As shown in FIG. 2, the date enable signal controller 230A outputs the output data enable signal DE' to the frame memory 210A, the blank controller circuit 220 and the signal generator 240.

The frame memory 210A delays the stored input image data RGB based on the output data enable signal DE' and generates output image data RGB'. The frame memory 210A outputs the output image data RGB' to the signal generator 240.

Based in part on the signal generator 240 receiving the output image data RGB' and the output data enable signal DE'. The signal generator 240 generates the first control signal CONT1, the second control signal CONT2, the third control signal CONT3 and the data signal DAT.

Alternatively, rather than being separate components, the frame memory 210A, the blank controller circuit 220 and the data enable signal controller 230A may be included in a graphic processing unit ("CPU") or a scaler.

Figure 4:
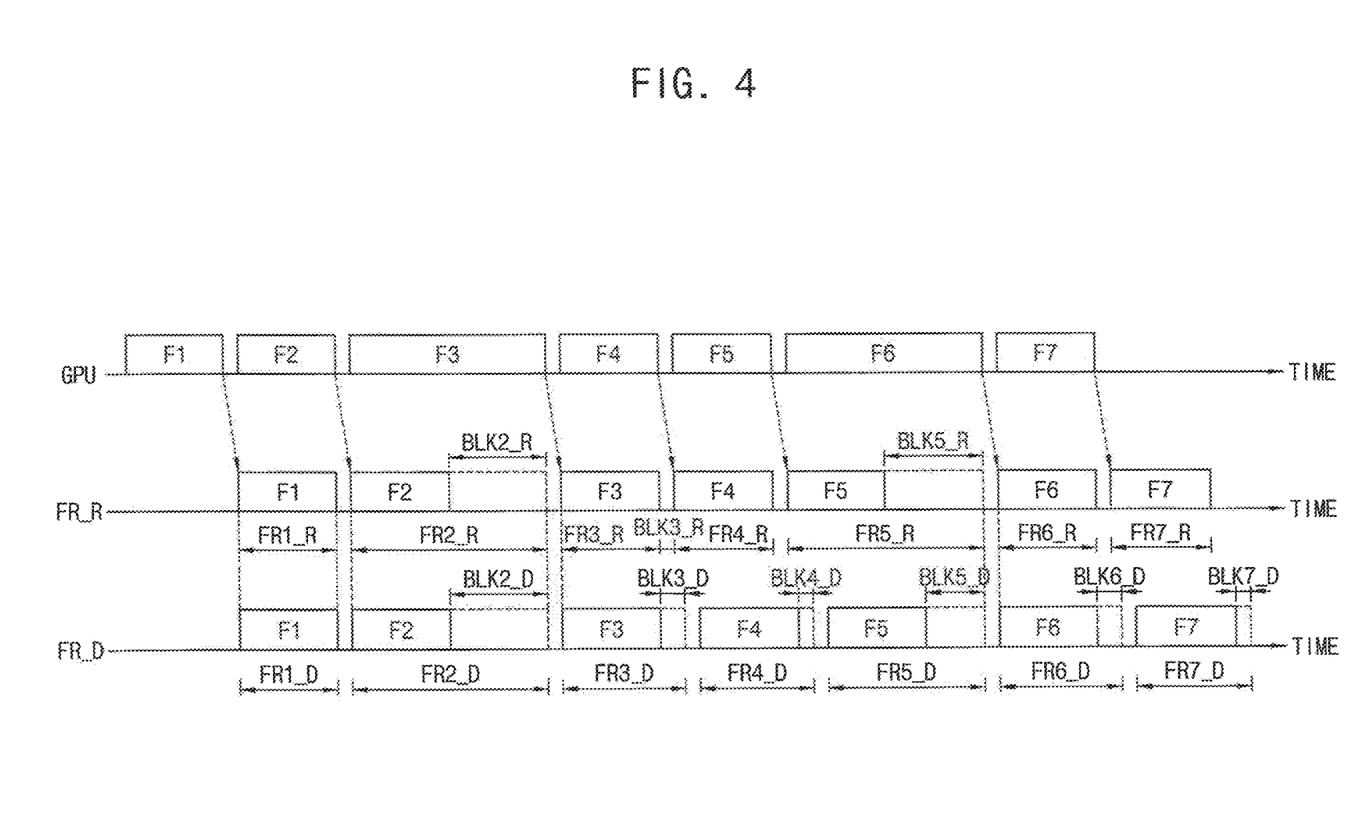
FIG. 4 is a timing diagram illustrating an example of frame timings outputted from a display apparatus according to an embodiment of FIG. 2.
Figure 5:
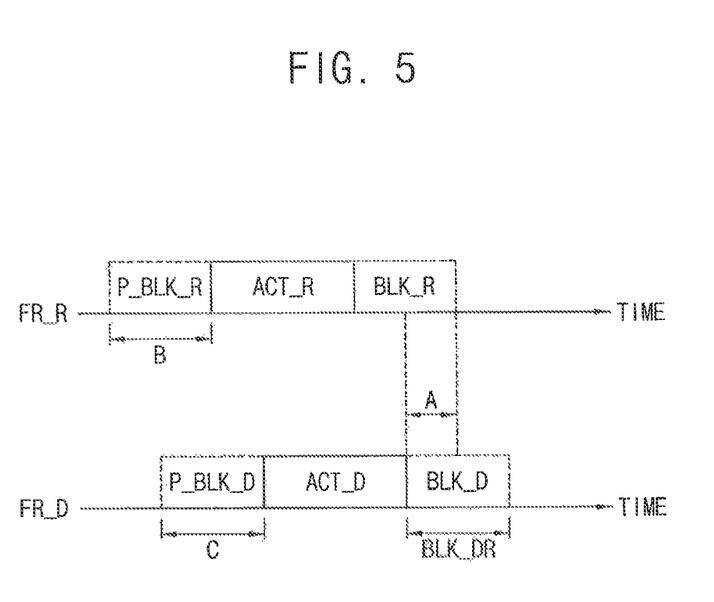
FIG. 5 is a timing diagram illustrating one of the frames in FIG. 4 in detail.

FIG. 4 is a timing diagram illustrating an example of frame timings outputted from a display apparatus according to an embodiment such as shown in FIG. 2. FIG. 5 is a timing diagram illustrating one of the frames in FIG. 4 in detail.

Referring to FIGS. 1 through 4, the input image data RGB may be a signal, which is rendered in a GPU. As previously discussed, the variations in the frequency of the input image data may result in flicker of the images being displayed. In this case, the input image FR_R may have a variable frequency corresponding to each frame according to the rendering speed. For example, in the input image FR_R, a frequency of a second frame F2 may be 60 Hz, and a frequency of a third frame F3 may be 144 Hz. In this case, a blank duration BLK2_R of the second frame F2 is longer than a blank duration BLK3_R of the third frame F3.

Referring to FIG. 5, the blank duration calculator 225 calculates the delay blank duration BLK_DR based on a first duration A, a previous reference blank duration B of the input image FR_R and a previous actual blank duration C of the output image FR_D. The first duration A is a duration between an end of an active duration ACT_D of the present frame of the output image FR_D and an end of a reference blank duration BLK_R of the present frame of the input image FR_R.

For example, the blank duration calculator 225 calculates the delay blank duration BLK_DR based on an equation below.

The delay blank duration(BLK_DR)=MAX(the first
duration(A), MAX(the previous reference blank
duration(B), the previous actual blank duration
(C))/N)

The N is greater than 1. Preferably, the N may be greater than or equal to 2.5 and smaller than or equal to 4. As the N decreases, an effect of the blank durations(B, C) corresponding to the previous frame increases. In other words, as the N decreases, a difference between the actual blank duration BLK_D corresponding to the present frame and the blank durations(B, C) corresponding to the previous frame decreases.

Figure 6:
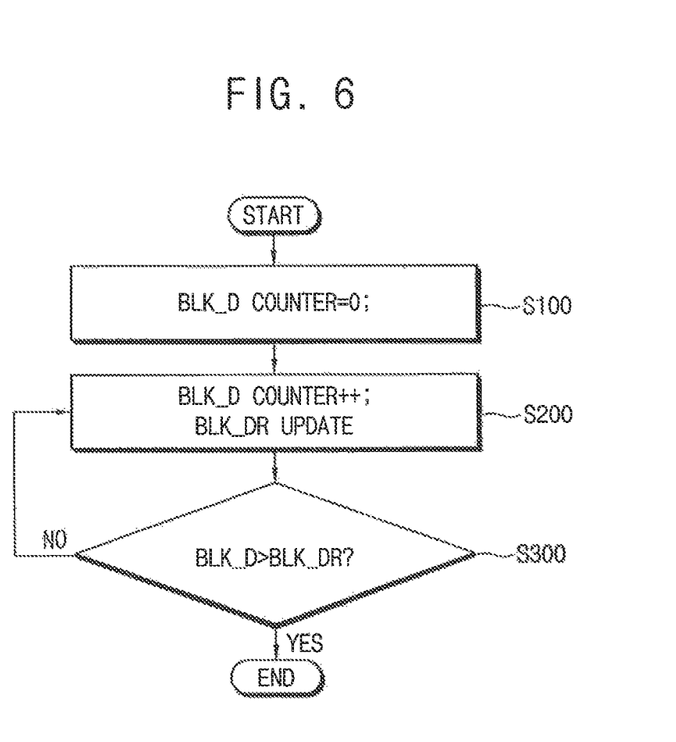
FIG. 6 is a flow chart illustrating a part of a method of driving a display apparatus according to an embodiment of FIG. 2.

FIG. 6 is a flow chart illustrating a part of a method of driving a display apparatus according to an embodiment such as shown in FIG. 2.

Referring to FIG. 6, a method of driving a display apparatus according to an embodiment of FIG. 2 includes starting to count an actual blank duration S100. The method further includes counting the actual blank duration and calculating a delay blank duration S200. The method further includes comparing the actual blank duration and the delay blank duration S300. Once the actual blank duration is substantially the same as the delay blank duration, an image is displayed.

Figure 7:
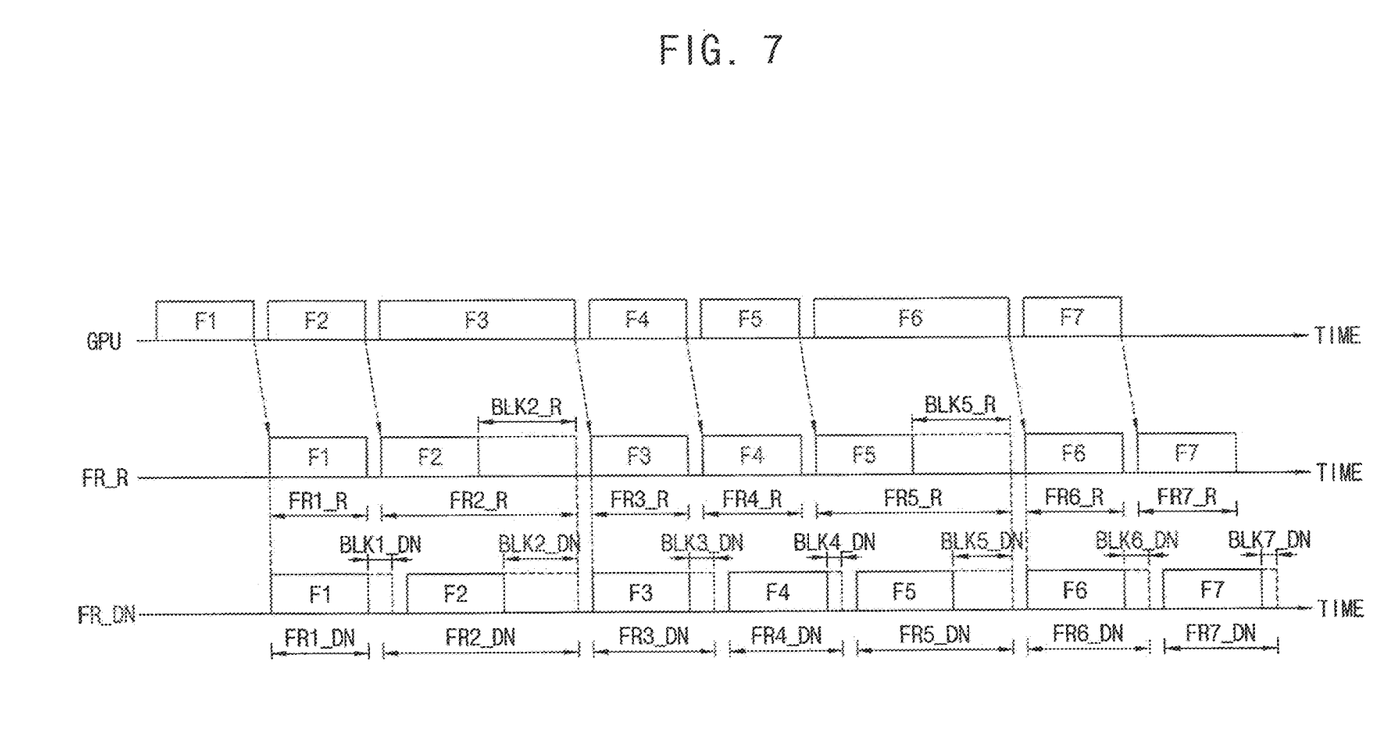
FIG. 7 is a timing diagram illustrating an example of frame timings outputted from a display apparatus according to an embodiment of the inventive concept.
Figure 8:
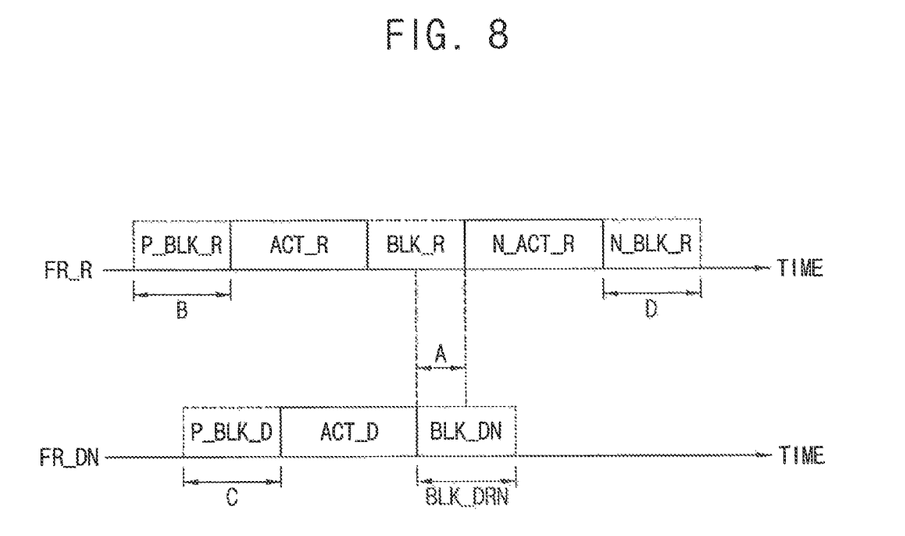
FIG. 8 is a timing diagram illustrating one of the frames in FIG. 7 in detail.

FIG. 7 is a timing diagram illustrating an example of frame timings outputted from a display apparatus according to an embodiment. FIG. 8 is a timing diagram illustrating one of the frames in FIG. 7 in detail.

Referring to FIGS. 1 through 3 and 7, the input image data RGB may be a signal, which is rendered in a GPU. In this case, the input image FR_R may have a variable frequency corresponding to each frame according to rendering speed. For example, in the input image FR_R, a frequency of a second frame F2 may be 60 Hz, and a frequency of a third frame F3 may be 144 Hz. In this case, a blank duration BLK2_R of the second frame F2 is longer than a blank duration BLK_R of the third frame F3.

Referring to FIG. 5, the blank duration calculator 225 may receive information about a next reference blank duration N_BLK_R corresponding to a next frame of the input image FR_R. The blank duration calculator 225 calculates the delay blank duration BLK_DRN based on a first duration A, a previous reference blank duration B of the input image FR_R, a previous actual blank duration C of the output image FR_DN and the next reference blank duration D of the input image FR_R. The first duration A is a duration between an end of an active duration ACT_D of the present frame of the output image FR_DN and an end of a reference blank duration BLK_R of the present frame of the input image FR_R.

For example, the blank duration calculator 225 calculates the delay blank duration. BLK_DRN based on an equation below.

The delay blank duration(BLK_DR$N$)=MAX(the first
duration(A), MAX(the previous reference blank
duration(B), the previous actual blank duration
(C))/N, the next reference blank duration(D)/M).

Each of the N and the M is greater than 1. Preferably, each of the N and the M may be greater than or equal to 2.5 and smaller than or equal to 6. As the N decreases, an effect of the blank durations(B, C) corresponding to the previous frame increases. As the M decreases, an effect of the blank duration(D) corresponding to the next frame increases. In other words, as the N and the M decrease, a difference between the actual blank duration BLK_DN corresponding to the present frame and the blank durations(B, C, D) corresponding to the previous frame and the next frame decreases.

Figure 9:
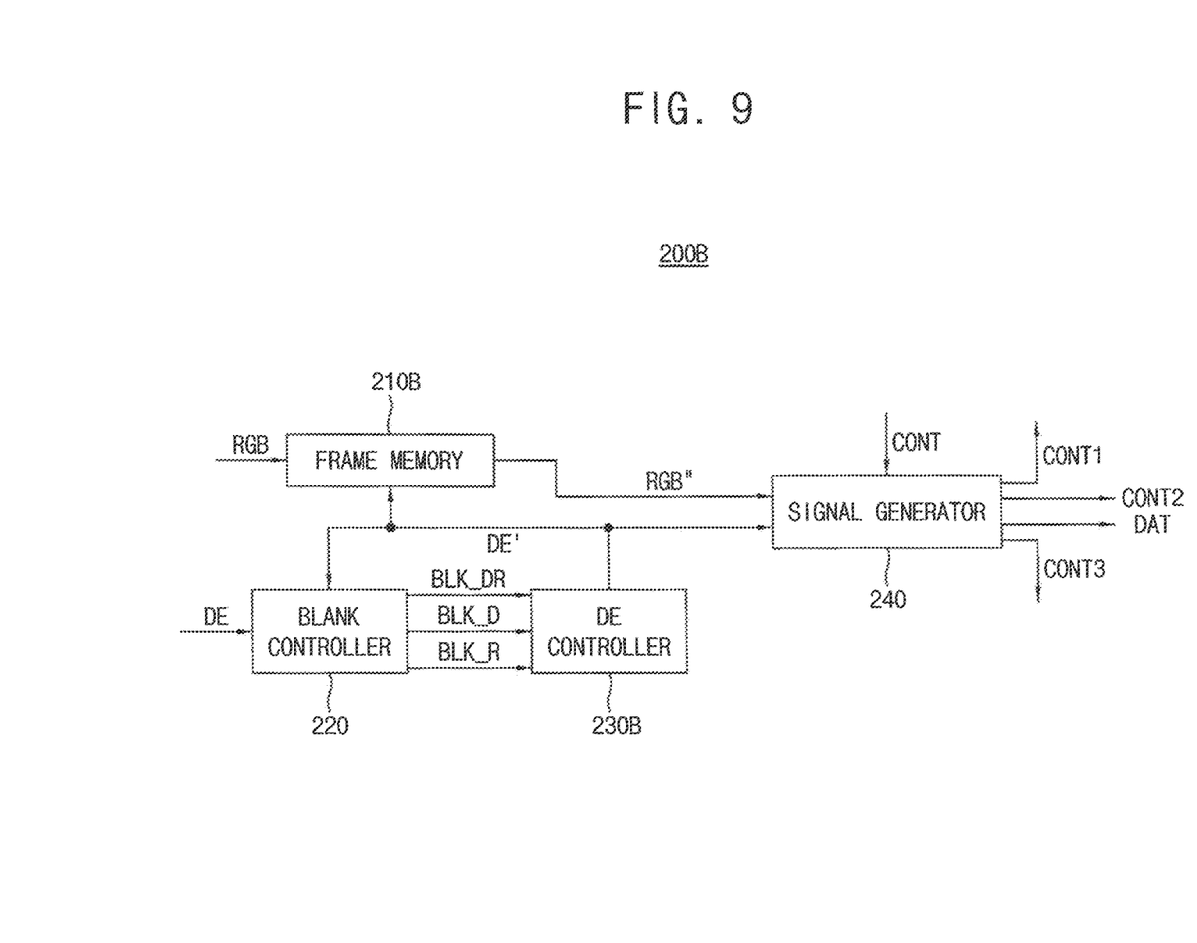
FIG. 9 is a block diagram illustrating a timing controller included in a display apparatus according to an embodiment of the inventive concept.
Figure 10:
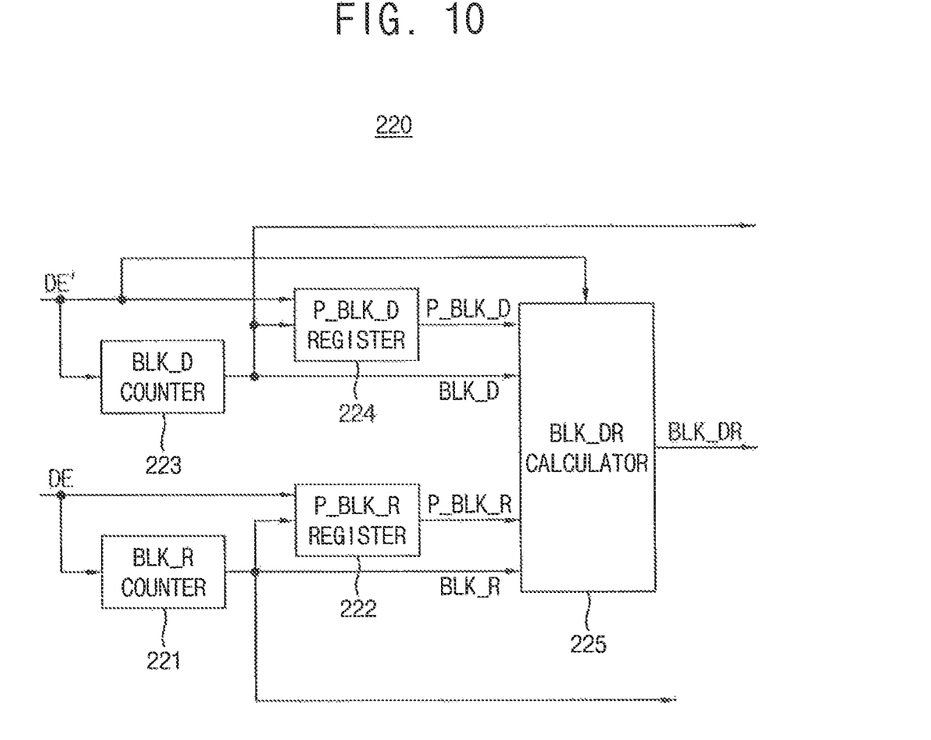
FIG. 10 is a block diagram illustrating a blank controller circuit included in a display apparatus according to an embodiment shown in FIG. 9.

FIG. 9 is a block diagram illustrating a timing controller 200B included in a display apparatus according to an embodiment. FIG. 10 is a block diagram illustrating a blank controller circuit 220 included in a display apparatus according to an embodiment of FIG. 9. Hereinafter, any repetitive explanation concerning FIGS. 2 and 3 will be omitted so as not to Obscure appreciation by a person of ordinary skill in the art of the inventive concept.

Referring now to FIGS. 1, 9 and 10, a timing controller 200B may include a frame memory 210B, a blank controller circuit 220, a data enable signal controller 230B and a signal generator 240. The data enable signal controller 230B and the signal generator 240 may be collectively referred to as a signal delay part.

The blank controller circuit 220 may include a blank duration calculator 225. The blank controller circuit 220 may further include a reference blank duration counter 221 and a delay blank duration counter 223. The blank controller circuit 220 may further include a reference blank duration register 222 and a delay blank duration register 224.

The reference blank duration counter 221 receives the input data enable signal DE. The reference blank duration counter 221 counts a blank duration of the input image based on the input data enable signal DE. For example, the reference blank duration counter 221 may count blank durations corresponding to a previous frame and the present frame of the input image. The reference blank duration counter 221 outputs a reference blank duration BLK_R, which is a result of the counting, to the reference blank duration register 222, the blank duration calculator 225 and the data enable signal controller 230B.

The data enable signal controller 230B receives the actual blank duration BLK_D, the delay blank duration BLK_DR and the reference blank duration BLK_R.

The date enable signal controller 230B may compare the reference blank duration BLK_R with a reference active duration. If the reference blank duration BLK_R is longer than the reference active duration, the date enable signal controller 230B may generate the output data enable signal DE so that image data of an active duration of a frame is inserted in an actual blank duration of the frame. If the reference blank duration BLK_R is shorter than the reference active duration, the date enable signal controller 230B may generate the output data enable signal DE' by the method explained in FIGS. 2 through 7.

The frame memory 210B generates output image data RGB" based on the input image data RGB and the output data enable signal DE'. The output image data RGB" may be delayed image data of the input image data RGB. The output image data RGB" may be image data where an active duration is inserted in a blank duration of the input image data RGB. The frame memory 210B outputs the output image data RGB" to the signal generator 240.

Figure 11:
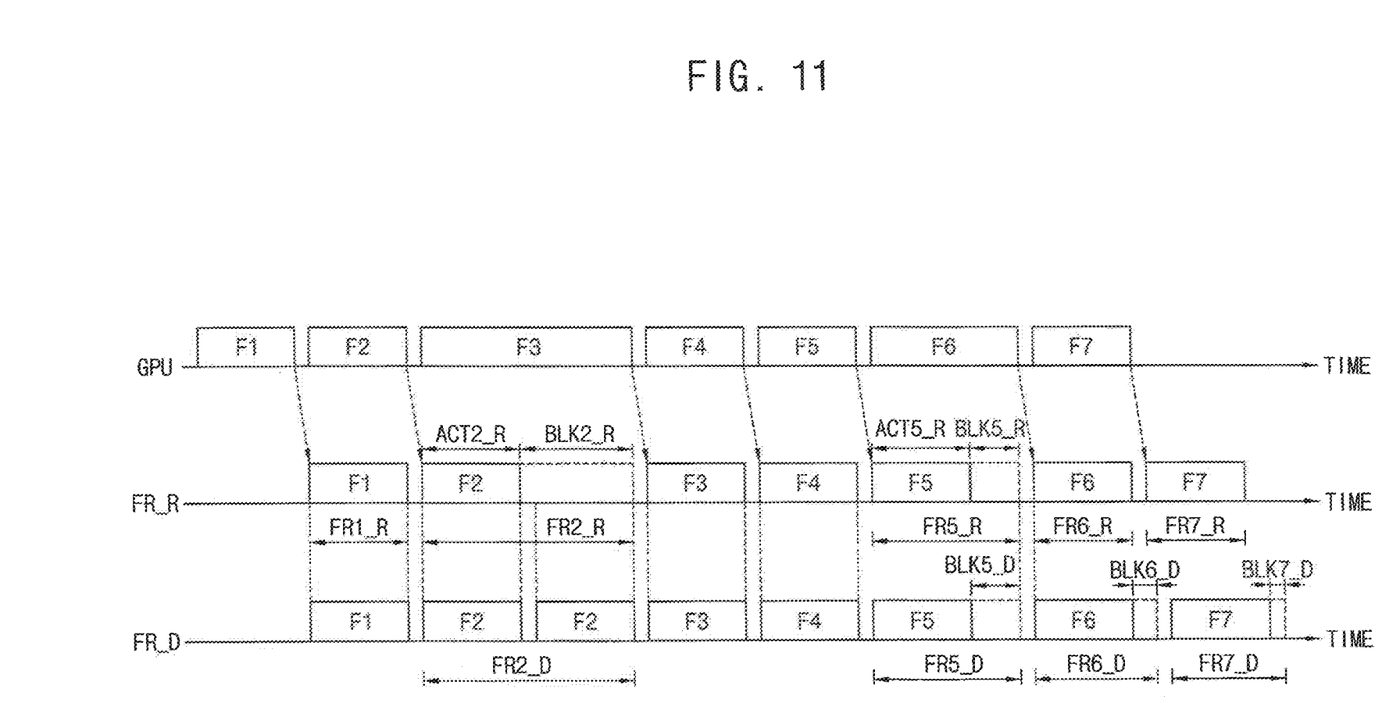
FIG. 11 is a timing diagram illustrating an example of frame timings outputted from a display apparatus according to the embodiment shown in FIG. 9.

FIG. 11 is a timing diagram illustrating an example of frame timings outputted from a display apparatus according to an embodiment shown in FIG. 9. Hereinafter, any repetitive explanation concerning FIG. 4 will be omitted.

Referring to FIGS. 1 and 9 through 11, the input image data RGB may be a signal, which is rendered in a GPU. In this case, the input image FR_R may have a variable frequency corresponding to each frame according to rendering speed. For example, in the input image FR_R, a frequency of a second frame F2 may be 60 Hz, a frequency of a fifth frame F5 may be 80 Hz, and frequencies of other frames may be 144 Hz. In this case, in the input image FR_R, a blank duration BLK2_R of the second frame F2 is more than twice as long as the blank durations of the other frames. In other words, in the input image the blank duration BLK2_R of the second frame F2 is longer than an active duration ACT2_R of the second frame F2. In the input image FR_R, a blank duration BLK5_R of the fifth frame F5 is shorter than twice the blank durations of the other frames. In other words, in the input image FR_R, the blank duration BLK5_R of the fifth frame 5 is shorter than an active duration ACT5_R of the fifth frame F5.

In the example shown in FIG. 11, the frame memory 210B may insert image data of the active duration ACT2_R of the second frame F2 in the blank duration BLK2_R of the second frame F2 to generate the output image data RGB" corresponding to the second frame F2. The frame memory 210B may generate the output image data RGB" corresponding to the fifth frame F5 and the other frames by the method explained in FIGS. 2 through 7.

Figure 12:
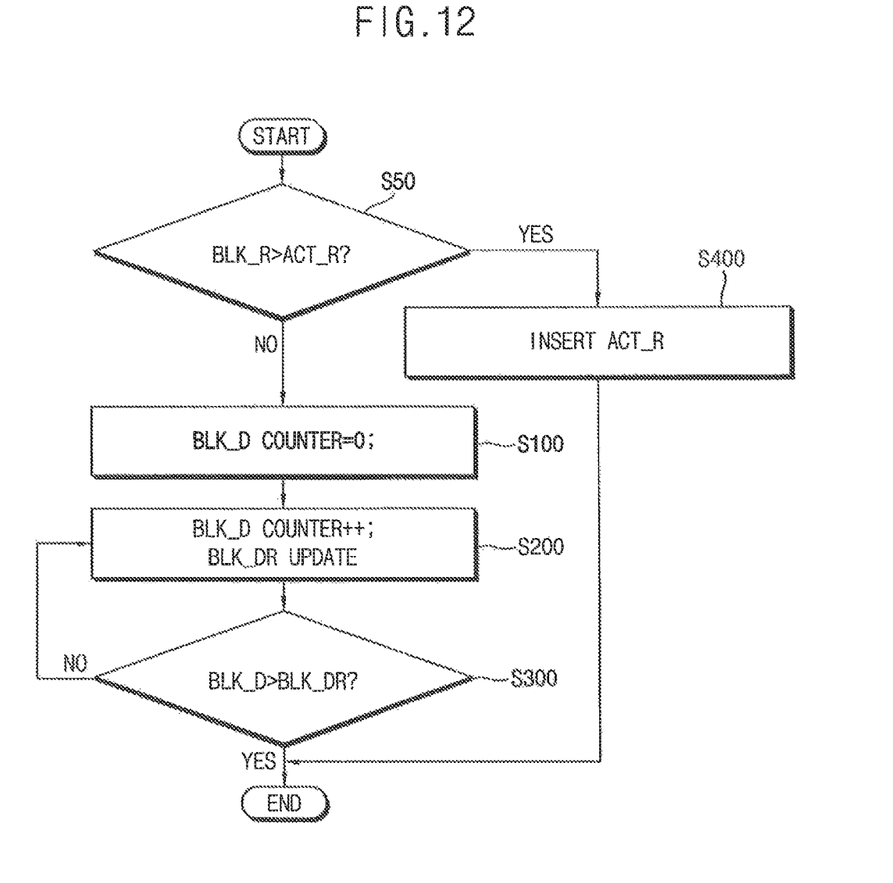
FIG. 12 is a flow chart illustrating a part of a method of driving a display apparatus according to the embodiment of FIG. 9.

FIG. 12 is a flow chart illustrating a part of a method of driving a display apparatus according to an embodiment of the inventive concept, such as shown in FIG. 9.

Referring to FIG. 12, at operation S50, a method of driving a display apparatus according to an embodiment of FIG. 9 may include comparing a reference blank duration with a reference active duration. If the reference blank duration is longer than the reference active duration, then at operation S400 the image data of an active duration of a frame is inserted in a blank duration of the frame to display an image. However, if the reference blank duration is shorter than the reference active duration, at operation S100 the method includes starting to count an actual blank duration, at operation S200 counting the actual blank duration and calculating a delay blank duration, and at operation S300 comparing the actual blank duration and the delay blank duration, and once the actual blank duration is substantially the same as the delay blank duration, an image is displayed.

The above described embodiments may be used in a display apparatus and/or a system including but in no way limited to the display apparatus, such as a mobile phone, a smart phone, a PDA, a PMP, a digital camera, a digital television, a set-top box, a music player, a portable game console, a navigation device, a personal computer (PC), a server computer, a workstation, a tablet computer, a laptop computer, a smart card, a printer, etc.

The foregoing is illustrative of at least one embodiment and is not to be construed as limiting thereof. Although a few embodiments have been described, those skilled in the art will readily appreciate that many modifications are possible in the embodiments without materially departing from the novel teachings of the present inventive concept. Accordingly, all such modifications are within the present inventive concept as defined in the claims. Therefore, it is to be understood that the foregoing is illustrative of various embodiments and is not to be construed as limited to the specific embodiments disclosed herein.

What is claimed is:

1. A display apparatus comprising:
a frame memory configured to store an input image signal having a first reference blank duration corresponding to a first frame and a second reference blank duration corresponding to a second frame subsequent to the first frame;
a blank controller circuit configured to determine a second delay blank duration based on the first reference blank duration and the second reference blank duration and a first delay blank duration;
a signal delay part configured to generate an output image signal having the first delay blank duration corresponding to the first frame and the second delay blank duration corresponding to the second frame based on the input image signal stored in the frame memory; and
a display panel configured to display an image based on the output image signal generated by the signal delay part.

2. The display apparatus of claim 1, wherein the blank controller circuit comprises:
a blank duration calculator configured to calculate the second delay blank duration based on a first duration, the first reference blank duration and the first delay blank duration, wherein the first duration is a duration that occurs between an end of an active duration of the second frame and an end of the second reference blank duration.

3. The display apparatus of claim 2, wherein blank duration calculator is configured to calculate the second delay blank duration according to the following equation:

$$(BLK\_DR) = MAX(A, MAX(B, C)/N),$$

wherein (BLK_DR) is equal to the second delay blank duration,
(A) is equal to the first duration,
(B) is equal to the first reference blank duration, and
(C) is equal to the first delay blank duration, and
wherein N is greater than 1.

4. The display apparatus of claim 3, wherein N is greater than or equal to 2.5 and smaller than or equal to 4.

5. The display apparatus of claim 2, wherein the input image signal comprises a signal rendered in a Graphics Processing Unit (GPU) having a variable frequency per-frame according to rendering speed, and the signal delay part comprises:
a signal generator that receives the output image signal from an interface of the frame memory and generates one or more output image signal control signals and data signal, and
a data enable signal controller that compares a reference blank duration with an reference active duration, and generates an output data enable signal (DE') to control the signal generator to insert image data of an active duration of a particular frame in a blank duration of the particular frame, when the reference blank duration is longer than the active duration of the particular frame.

6. The display apparatus of claim 2, wherein the blank controller circuit further comprises:
a reference blank duration counter configured to count the first reference blank duration and the second reference blank duration based on an input data enable signal corresponding to the input image signal; and
a delay blank duration counter configured to count a blank duration of the second frame based on an output data enable signal corresponding to the output image signal.

7. The display apparatus of claim 6, wherein the signal delay part is configured to generate the output image signal so that the blank duration of the second frame is substantially the same duration as the second delay blank duration.

8. The display apparatus of claim 6, wherein the blank controller circuit further comprises:
a reference blank duration register configured to store a count value of the reference blank duration counter; and
a delay blank duration register configured to store a count value of the delay blank duration counter.

9. The display apparatus of claim 1, wherein the blank controller circuit is configured to receive information about a third reference blank duration corresponding to a third frame subsequent to the second frame, and the blank controller circuit comprises:

a blank duration calculator configured to calculate the second delay blank duration based on a first duration, the first reference blank duration, the first delay blank duration and the third reference blank duration, wherein the first duration is a duration that occurs between an end of an active duration of the second frame and an end of the second reference blank duration.

10. The display apparatus of claim 9, wherein the second delay blank duration is equal to MAX (the first duration, MAX (the first reference blank duration, the first delay blank duration)/N, the third reference blank duration/M), wherein each of N and M is greater than 1.

11. The display apparatus of claim 10, wherein each of N and M is greater than or equal to 2.5 and smaller than or equal to 6.

12. The display apparatus of claim 1, wherein the input image signal is a rendered signal, and has a variable frequency by each frame according to rendering speed.

13. A method of driving a display apparatus, the method comprising:

storing an input image signal having a first reference blank duration corresponding to a first frame and a second reference blank duration corresponding to a second frame subsequent to the first frame;

generating a first output image signal having a first delay blank duration corresponding to the first frame;

determining a second delay blank duration based on the first reference blank duration and the second reference blank duration and the first delay blank duration;

generating a second output image signal having the second delay blank duration corresponding to the second frame; and displaying an image based on the first output image signal and the second output image signal.

14. The method of claim 13, wherein the determining the second delay blank duration comprises:

calculating the second delay blank duration based on a first duration, the first reference blank duration and the first delay blank duration, wherein the first duration is a duration that occurs between an end of an active duration of the second frame and an end of the second reference blank duration.

15. The method of claim 14, wherein the second delay blank duration is equal to MAX (the first duration, MAX (the first reference blank duration, the first delay blank duration)/N), wherein N is greater than 1.

16. The method of claim 14, further comprising:

counting the first and second reference blank durations based on an input data enable signal corresponding to the input image signal; and counting a blank duration of the second frame based on an output data enable signal corresponding to the second output image signal.

17. The method of claim 16, further comprising:

comparing the blank duration of the second frame with the second delay blank duration.

18. The method of claim 13, further comprising:

receiving information about a third reference blank duration corresponding to a third frame subsequent to the second frame; and calculating the second delay blank duration based on a first duration, the first reference blank duration, the first delay blank duration and the third reference blank duration, wherein the first duration is a duration that occurs between an end of an active duration of the second frame and an end of the second reference blank duration.

19. The method of claim 18, wherein the second delay blank duration is equal to MAX (the first duration, MAX (the first reference blank duration, the first delay blank duration)/N, the third reference blank duration/M), wherein each of N and M is greater than 1.

20. The method of claim 13, wherein the input image signal is a rendered signal, and has a variable frequency by each frame according to rendering speed.

21. A method of driving a display apparatus, the method comprising:

storing an input image signal having a first reference active duration and a first reference blank duration corresponding to a first frame and a second reference active duration and a second reference blank duration corresponding to a second frame subsequent to the first frame;

generating an output image signal having a first delay blank duration corresponding to the first frame;

comparing the second reference blank duration with the second reference active duration;

inserting an input image signal of the second reference active duration in a blank duration of the second frame to generate the output image signal when the second reference blank duration has a longer duration than the second reference active duration;

determining a second delay blank duration based on the first and second reference blank durations and the first delay blank duration and generating the output image signal having the second delay blank duration corresponding to the second frame when the second reference blank duration is shorter than the second reference active duration; and displaying an image based on the output image signal.

* * * * *